(12) United States Patent
Chen et al.

(10) Patent No.: US 8,005,771 B2
(45) Date of Patent: Aug. 23, 2011

(54) SEGMENT-BASED CHANGE DETECTION METHOD IN MULTIVARIATE DATA STREAM

(75) Inventors: Terrence Chen, Princeton, NJ (US); Chao Yuan, Secaucus, NJ (US); Abdul Saboor Sheikh, Pittsburgh, PA (US); Claus Neubauer, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 582 days.

(21) Appl. No.: 12/236,587

(22) Filed: Sep. 24, 2008

(65) Prior Publication Data

US 2009/0091443 A1    Apr. 9, 2009

Related U.S. Application Data

(60) Provisional application No. 60/977,491, filed on Oct. 4, 2007.

(51) Int. Cl.
*G06F 15/18* (2006.01)
(52) U.S. Cl. .......................................................... 706/12
(58) Field of Classification Search ...................... 706/12
See application file for complete search history.

(56) References Cited

U.S. PATENT DOCUMENTS

| 2005/0149299 | A1 | 7/2005 | Bolt et al. | |
|---|---|---|---|---|
| 2006/0036403 | A1 | 2/2006 | Wegerich et al. | |
| 2010/0039434 | A1* | 2/2010 | Makkinejad | 345/473 |

FOREIGN PATENT DOCUMENTS

| EP | 1 793 296 A | 6/2007 |
|---|---|---|
| WO | 2006/046251 A | 5/2006 |

OTHER PUBLICATIONS

Transformation of short-term spectral envelope of speech signal using multivariate polynomial modeling, Lehana, P.K.; Pandey, P.C.; Communications (NCC), 2011 National Conference on Digital Object Identifier: 10.1109/NCC.2011.5734732 Publication Year: 2011, pp. 1-5.*
A Novel Approach for Frequent Phrase Mining in Web Search Engine Query Streams, Barouni-Ebarhimi, M.; Ghorbani, A.A.; Communication Networks and Services Research, 2007. CNSR '07. Fifth Annual Conference on Digital Object Identifier: 10.1109/CNSR.2007.5 Publication Year: 2007, pp. 125-132.*
Scaling clustering algorithms for massive data sets using data streams, Nittel, S.; Leung, K.T.; Braverman, A.; Data Engineering, 2004. Proceedings. 20th International Conference on Digital Object Identifier: 10.1109/ICDE.2004.1320061 Publication Year: 2004.*
Detection of representative frames of a shot using multivariate Wald-Wolfowitz test, Mohanta, P.P.; Saha, S.K.; Chanda, B.; Pattern Recognition, 2008. ICPR 2008. 19th International Conference on Digital Object Identifier: 10.1109/ICPR.2008.4761403 Publication Year: 2008, pp. 1-4.*

(Continued)

*Primary Examiner* — Michael B Holmes (57) ABSTRACT

A method and framework are described for detecting changes in a multivariate data stream. A training set is formed by sampling time windows in a data stream containing data reflecting normal conditions. A histogram is created to summarize each window of data, and data within the histograms are clustered to form test distribution representatives to minimize the bulk of training data. Test data is then summarized using histograms representing time windows of data and data within the test histograms are clustered. The test histograms are compared to the training histograms using nearest neighbor techniques on the clustered data. Distances from the test histograms to the test distribution representatives are compared to a threshold to identify anomalies.

20 Claims, 6 Drawing Sheets

OTHER PUBLICATIONS

Chandola et al., "Anomaly detection: A survey", Technical Report TR 07-017, Aug. 15, 2007, pp. 1-72.

Hamid et al., "Detection and Explanation of Anomalous Activities: Representing Activities as Bags of Event n-Grams", Computer Vision and Pattern Recognition, 2005 IEEE Computer Society Conference, IEEE, Piscataway, NJ, vol. 1, Jun. 20, 2005, pp. 1031-1038.

International Search Report including Notification of Transmittal of the International Search Report, International Search Report, and Written Opinion of the International Searching Authority.

Rubner et al., "The Earth Mover's Distance as a Metric for Image Retrieval", International Journal of Computer, Vision, 40(2), pp. 99-121, 2000.

Manjunathi et al., "Texture Features for Browsing and Retrieval of Image Data", IEEE Transactions on Pattern Analysis and Machine Intelligence, 18(8), pp. 837-842, 1996.

Ester et al., "A Density-Based Algorithm for Discovering Clusters in Large Spatial Databases With Noise", Proceedings of the Second International Conference on Knowledge Discovery and Data Mining, 1996.

Cover et al., "Nearest Neighbor Pattern Classification", IEEE Transactions on Information Theory, 13(1), pp. 21-27, 1967.

Scholkopf et al., "Estimating the Support of a High-Dimensional Distribution", Neural Computation, 13(7), pp. 1443-1471, 1999.

* cited by examiner

SEGMENT-BASED CHANGE DETECTION METHOD IN MULTIVARIATE DATA STREAM

CLAIM OF PRIORITY

This application claims priority to, and incorporates by reference herein in its entirety, U.S. Provisional Patent Application Ser. No. 60/977,491, filed Oct. 4, 2007, and entitled "Segment-Based Change Detection Method in Multivariate Data Stream."

FIELD OF THE INVENTION

The present invention relates generally to the monitoring of multivariate data streams. More specifically, the invention relates to techniques for detecting changes in such data streams.

BACKGROUND OF THE INVENTION

Change detection has been an important research topic in the field of pattern recognition, machine learning, data mining, and other related areas. Detection of changes in a video stream can be used to identify abnormal events or suspicious activities. Changes in a large amount of data in a continuous data stream can be used for fault detection or prediction.

In one application of change detection, an anomaly in data readings of a machine is used to alarm the user before a serious problem develops. That application is known as the task of machine condition monitoring. Machine condition monitoring presents the challenge of detecting change amid multiple sensors by quickly analyzing large amounts of real-time data. One difficulty is that different sensors may or may not be related to each other. That may necessitate the selection or grouping of relevant sensors while monitoring certain faults. In practice, the determination of dependencies between sensors is not always obvious.

One-class support vector machines (SVMs) have been used in this application. SVMs are a set of related supervised learning methods used for classification and regression. Input data is viewed as two sets of vectors in an n-dimensional space. The SVM constructs a separating hyperplane in that space, which maximizes the margin between the two data sets. SVM does not take into account significant temporal information during the learning process, limiting its ability to detect certain anomalies that are common in practice. Further, correlation analysis is often needed to consider the relationship of plural sensors. The procedure is calculation-intensive and therefore not ideal for real-time monitoring of data-intensive streams.

There is therefore presently a need for a method and system for efficient real-time monitoring of data streams from plural interrelated machine sensors with the ability to detect changes or anomalies. To the inventors' knowledge, no such techniques are currently available.

SUMMARY OF THE INVENTION

The present invention addresses the needs described above by providing a novel framework that can quickly analyze and detect anomalies in multidimensional data streams. The method utilizes temporal information as well as state of the art clustering and distribution distance computation methods to build up a framework that can outperform existing methods.

One embodiment of the invention is a method for detecting a change from a normal state in a multivariate data stream. The method comprises the steps of: (A) receiving a multidimensional training data stream including a plurality of data points representing a normal state; (B) sampling a plurality of m segment windows in the training data stream, each segment window representing a predefined time interval in the data stream; (C) for each of said plurality of segment windows, summarizing a distribution of data points in the segment window by constructing a training histogram h; (D) representing each training histogram $h_i$ by a set of distribution representatives $r_i$ using clustering; (E) receiving a test data stream including a plurality of multidimensional data points; (F) sampling data points in a plurality of segment windows in the test data stream, each segment window representing a predefined time interval in the data stream; (G) for each segment window in the test data, summarizing a distribution of data points in the segment window by constructing a test histogram h'; (H) representing each test histogram h' by a set of distribution representatives r' using clustering; (I) comparing test histograms h' with training histograms $h_i$ using the distribution representatives to find closest matches using a similarity measure S; and (J) transmitting an indication that the multivariate data stream contains a change from the normal state for those segments having a similarity measure S indicating a similarity lower than a decision threshold $\sigma$.

Each distribution representative $r_i$ may include a centroid $c_i$ of a cluster; a weight $w_i$ representing a number of points in the cluster; and a vector $v_i$ representing variation within each feature in the cluster. The clustering may be performed using a DBSCAN spatial clustering algorithm.

The similarity measure S, for each comparison of a test histogram h' and a training histogram $h_i$, may be determined by $S(h',h_i)=\min \text{dist}(h',h_i) \forall\ h_i$.

The similarity $S(h', h_i)$ may be calculated by using an earth mover's distance metric between a set of bins A representing h', and a set of bins B representing $h_i$, the distance metric formulated as $$EMD(A, B) = \min_{F=\{f_{ij}\}} \frac{\sum_{i=1}^{m}\sum_{j=1}^{n} f_{ij}d_{ij}}{\sum_{i=1}^{m}\sum_{j=1}^{n} f_{ij}}, \text{ wherein}$$

$\sum_{i=1}^{m}\sum_{j=1}^{n} f_{ij} = \min(\sum_{i=1}^{m} a_i, \sum_{j=1}^{n} b_j)$, $\sum_{i=1}^{m} f_{ij} \leq a_i$, and $\sum_{j=1}^{n} f_{ij} \leq b_j$, $a_i$ and $b_j$ are numbers of points in particular bins of A and B respectively, $F=\{f_{ij}\} \in F$, where F is a set of all possible flows between A and B and $f_{ij}$ determines the mass flow from bin i in A to bin j in B, and $d_{ij}$ is the distance or cost of transportation between corresponding bins.

The method may further comprise the steps of, for each test histogram h' wherein S indicates a similarity lower than a decision threshold $\sigma$, computing a global average cost per data point; and transmitting an indication that those data points having a cost exceeding the global average cost per data point are anomalies. The global average cost per data point may be measured taking into account a centroid of the histogram and a span of the histogram. The global average cost per data point may be measured by calculating a weighted-mean-variance distance.

The method may further comprise the step of, before performing clustering, adding time indices to data points within the segment window.

The multivariate data stream may comprise a data stream from a plurality of sensors monitoring a machine, and the indication that the multivariate data stream contains a change may comprise a machine fault alarm.

Another embodiment of the invention is a computer-usable medium having computer readable instructions stored thereon for execution by a processor to perform the above-described method for detecting a change from a normal state in a multivariate data stream.

DESCRIPTION OF THE INVENTION

The present invention is a new framework for change detection in multivariate data streams. The method employs temporal information such as distribution variation to improve existing change detection algorithms. Experiments conducted on both synthetic and real-world data show that the method has improved performance over other existing methods used in one-class learning such as such as SVM.

The method of the present invention has several significant advantages. Temporal information is taken into account so that changes in temporal domain are detectable. Further, data points are clustered naturally in the framework so that correlation analysis is not necessarily needed to group correlated sensors together before training.

The framework of the present invention defines the machine condition monitoring task as a change detection problem. Given a period of time over which the machine is operating normally, the framework detects, based on training input data, whether new input data deviates from normal operating data.

A nearest neighbor (NN) problem is defined as follows: given some observation $x' \in R^n$, a label or class $c \in C$ must be assigned to $x'$ where C is the set of known labels or categories. The decision depends on a collection of correctly classified samples $X=\{(x_1,c_1),(x_2,c_2),\ldots,(x_n,c_n)\}$, where $x_i \in R^n$ and $c_i \in C$. The decision procedure is a simple non-parametric procedure that assigns the label $c_i \in C$ of sample $x_i$ to new observation $x'$ such that $$d(x',x_i) = \min \; \text{dist}(x',x_i) \forall x_i \in X.$$

The presently described invention models machine condition monitoring as a nearest neighbor problem. Specifically, the nearest neighbor of each test data point is found in the training data set. If the distance between them is greater than a predefined threshold, that data point is regarded as a change or anomaly.

There are certain factors in the machine condition monitoring problem, however, that differ from a simple NN approach. First, in machine condition monitoring, the data contains a large number of fault types, many of which may not be available for modeling. Hence, a robust monitoring algorithm must be able to train a good model using only fault-free data. That makes the problem more difficult and is known as one-class learning in the literature. Secondly, in order to take into consideration the temporal information contained in a time series of data, the successive values cannot be considered independent from each other; data points cannot simply be compared to one another.

To address those problems, the inventors have developed a method and system wherein a window-based change detecting algorithm is applied in conjunction with a state of the art distance metric and a clustering algorithm.

Figure 1:
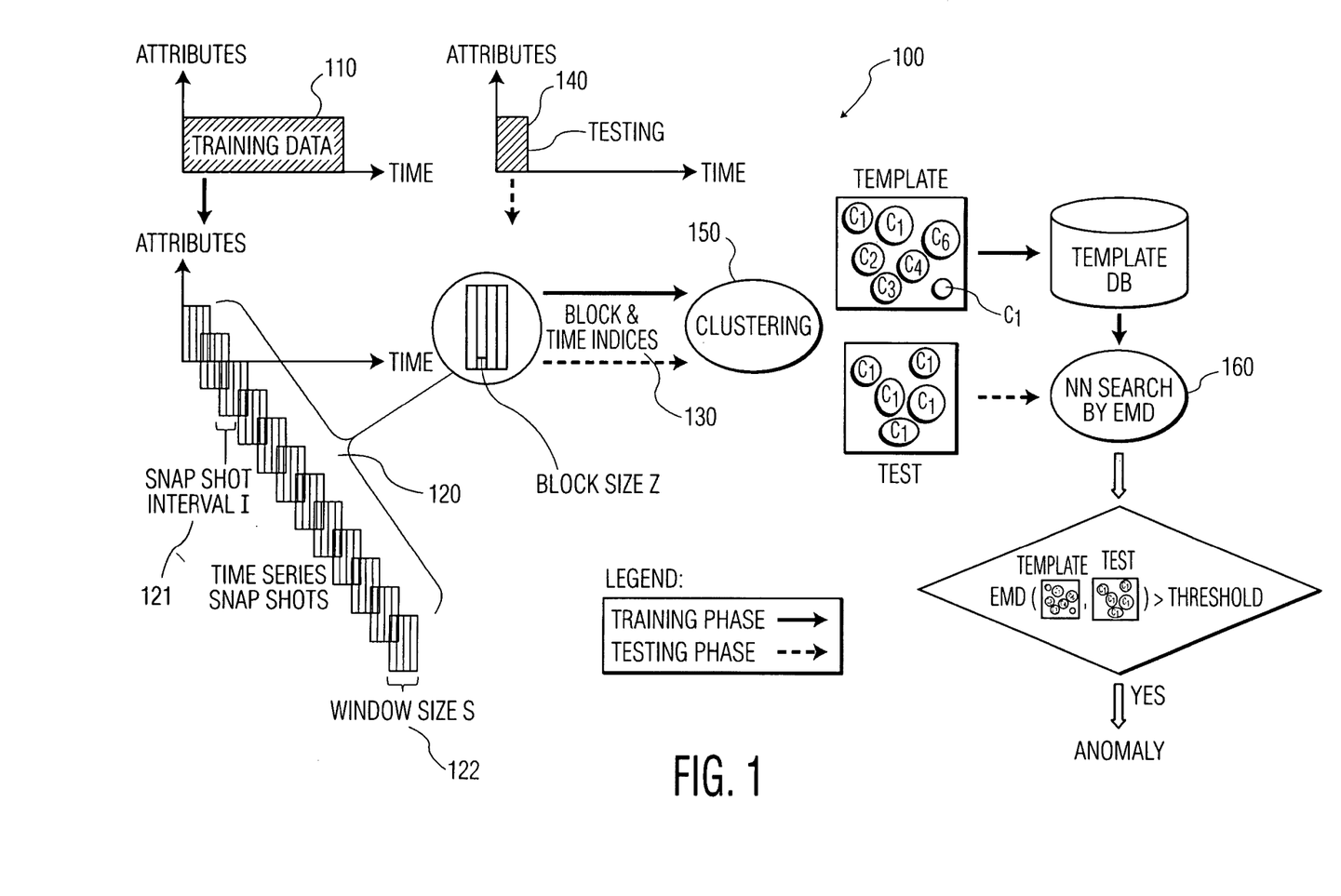
FIG. 1 is a schematic diagram showing a framework for change detection in a multivariate data stream according to the invention.

FIG. 1 illustrates an overall framework for a change detection technique according to the invention for use on a multivariate data stream. A training data stream 110 is initially received. The data includes n multidimensional data points representing a normal state.

A moving segment window 122 of size s is defined for sampling the data. The size s is optimized in a way that it can capture the minimum data points required to represent all signatures that occur in the training data 110.

Initially, the moving segment window 122 is placed in the beginning of training data-stream 110. The distribution of the first segment $s_1$ is summarized using a histogram $h_1$, which is placed in a training set H. The segment window is then moved by a predefined snapshot interval 121 having a value I. The same procedure is applied to construct a histogram $h_2$ from the second segment $s_2$, which again is added to the training set H. That procedure is iteratively applied until the end of the training data 110. After the training process, a training set $H=\{h_1, h_2, \ldots, h_m\}$ is obtained, where m is the number of segments used in the training process.

Constructing histograms from the training data is an important component in the framework of the invention. It reduces a relatively large set of data points within a window into a small number of representatives. That significantly improves the efficiency of the monitoring process by making the matching process faster, as through the use of the earth mover's distance algorithm described below.

Conventional binning is not an efficient remedy in the machine monitoring problem since that problem involves high dimensional data that imposes the curse of dimensionality, leaving most of the bins empty or with very few points. Further, most sensor data is sparse globally but dense locally. To solve that problem, a clustering step 150 (FIG. 1) is performed on normalized data over each histogram to construct distribution representatives where each representative $r_i$ is a set of three values:

$c_i$, an n-dimensional centroid of a cluster, $w_i$, weight, represents the number of points in a cluster, and $v_i$, an n-dimensional vector, represents variation within each feature in the cluster.

After clustering, each histogram $h_i$ can be represented by a set of distribution representatives $R_i$, where $r_j \in R_i$, $j=\{1, \ldots, m\}$, m is the number of representatives in $h_i$.

Without limiting the clustering methods to be used in the presently described method, the inventors note that in practice the DBSCAN data clustering algorithm, originally proposed by Martin Ester, Hans-Peter Kriegel, Jörg Sander and Xiaovei Xui in 1996, is a preferred clustering method due to its non-parametric feature. DBSCAN (Density-Based Spatial Clustering of Applications with Noise) is a density based clustering algorithm that finds a number of clusters starting from the estimated density distribution of corresponding nodes.

To retain the temporal information within a segment, time indices 130 are added as an additional attribute of histogram blocks of size z before the clustering step 150.

In the monitoring phase, test data 140 is fed into the system to detect any change compared to the training data 110. As with the training data, data is collected over a segment of length s, a histogram h' is constructed, and clustering is performed to represent the histogram h' as a set of distribution representatives. The histogram h' is compared with all the templates $h_i$ in template set H constructed during the training process. The closest match is then determined using a similarity measure $S(h', h_i)$ such that $$S(h',h_i)=\min \text{Dist}(h',h_n) \forall h_n \epsilon H$$

Based on the value S obtained from the similarity measure, a prediction is made whether the segment contains faulty data by using a decision threshold σ. Where a segment is identified as faulty data, a global average cost per point σ/|h'| is computed. All points in any cluster ϵ h' and that have a local average cost greater than the global average are marked as anomalies.

EMD (Earth Mover's Distance) is presented in Yossi Rubner, Carlo Tomasi, and Leonidas J. Guibas. The Earth Mover's Distance as a Metric for Image Retrieval, International Journal of Computer Vision, 40(2), pp. 99-121 (2000) as a metric for measuring texture and color similarities for image retrieval. EMD is a histogram matching technique that is based on the mass transport problem that was first presented by Monge in 1700s. EMD solves the following problem: given m piles of mass and n pits, what is the minimum work required to be done in order to move the mass from the piles to fill the pits. There is a certain cost of moving mass between each pair of pile and pit, and there is a constraint that limits the maximum mass transfer to the minimum of cumulative mass available and the cumulative depth/capacity of pits.

EMD considers one histogram as the set of piles and the other as the set of pits. The problem is formulated as $$EMD(A,B) = \min_{F=\{f_{ij}\}} \frac{\sum_{i=1}^{m}\sum_{j=1}^{n} f_{ij}d_{ij}}{\sum_{i=1}^{m}\sum_{j=1}^{n} f_{ij}},$$

where $\sum_{i=1}^{m}\sum_{j=1}^{n}f_{ij}=\min(\sum_{i=1}^{m}a_i,\sum_{j=1}^{n}b_j)$, $\sum_{i=1}^{m}f_{ij}\leq a_i$, and $\sum_{j=1}^{n}f_{ij}\leq b_j$. $a_i$ and $b_j$ are the weights (i.e. number of points) of bins in A and B respectively, $F=\{f_{ij}\}\epsilon F$, where F is the set of all possible flows between A and B and $f_{ij}$ determines the mass flow from bin i in A to bin j in B. $d_{ij}$ is the distance or cost of transportation between corresponding bins. The denominator in the formula is a penalizing term that penalizes small histograms being matched against large ones.

A method for computing the cost of unit movement across bins of histograms preferred by the inventors is the Weighted Mean Variance distance, discussed in B. S. Manjunathi and W. Y. Ma, Texture Features for Browsing and Retrieval of Image Data, IEEE Transactions on Pattern Analysis and Machine Intelligence, 18(8), pp. 837-842 (1996). That measure is selected to take into account both the centroid and the spans of the clusters. The measure is incorporated using WMV distance into one value as $$D^r(I,J) = \frac{|\mu_r(I)-\mu_r(J)|}{|\sigma(\mu_r)|} + \frac{|\sigma_r(I)-\sigma_r(J)|}{|\sigma(\sigma_r)|},$$

where the first term simply measures the normalized distance between centroids, while the second term incorporates the difference in the spans of clusters being matched by using the difference in standard deviation of corresponding attributes normalized by the standard deviation of the deviation in that attribute among all the clusters in our training set.

The inventors have performed experiments on both synthetic and real data. Those experiments utilized the EMD algorithm discussed in F. S. Hillier and G. J. Lieberman, Introduction to Mathematical Programming (McGraw-Hill 1990).

Figure 2:
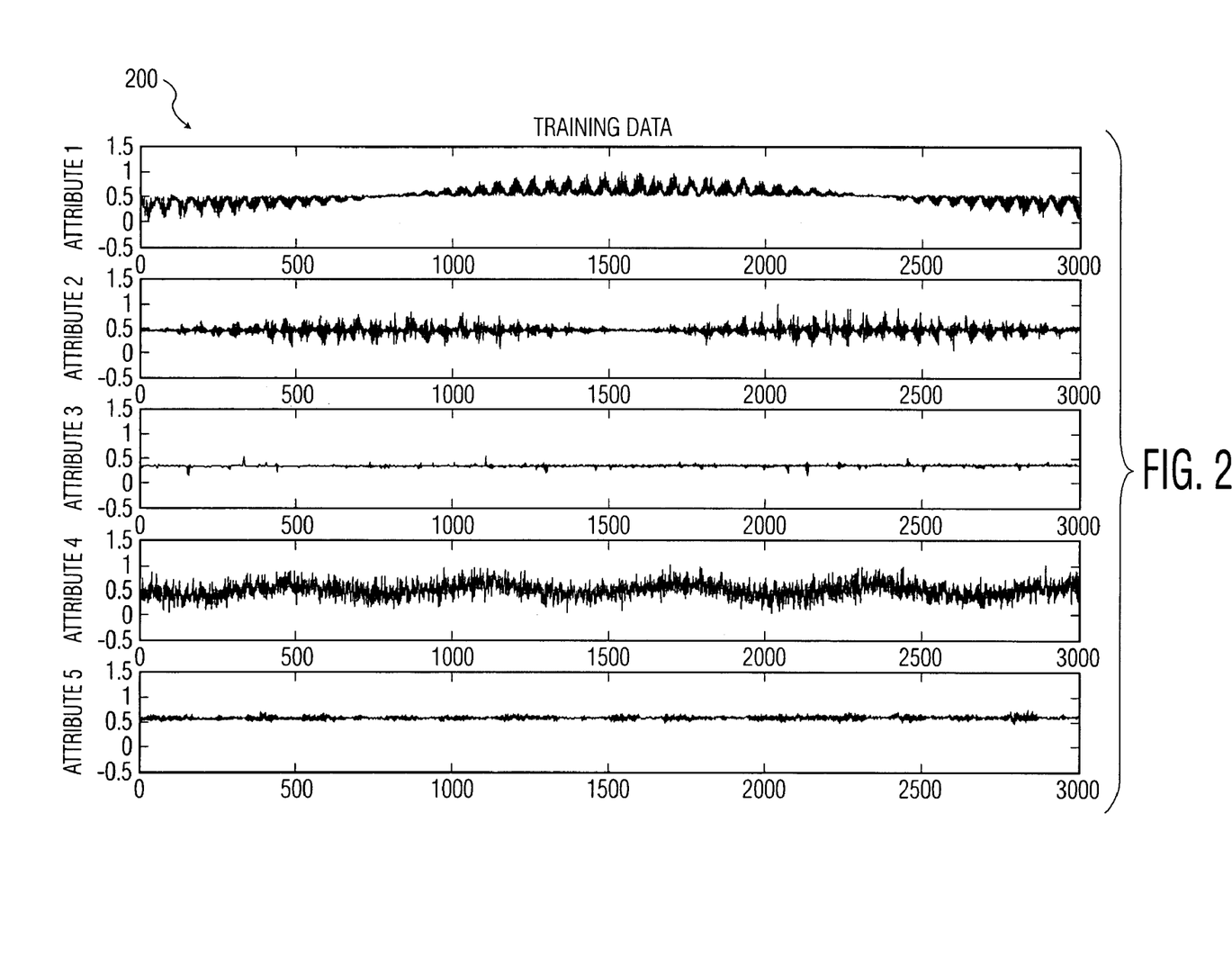
FIG. 2 is a plot showing five attributes of synthetic baseline data for use in testing a system of the invention.

In one experiment, synthetic training data having five attributes was generated as baseline. Generated training data is shown in the plot 200 of FIG. 2. Generated testing data is shown in the plot 300 of FIG. 3. The testing data contains faults marked by the bars labeled 'f' in the figure.

Figure 3:
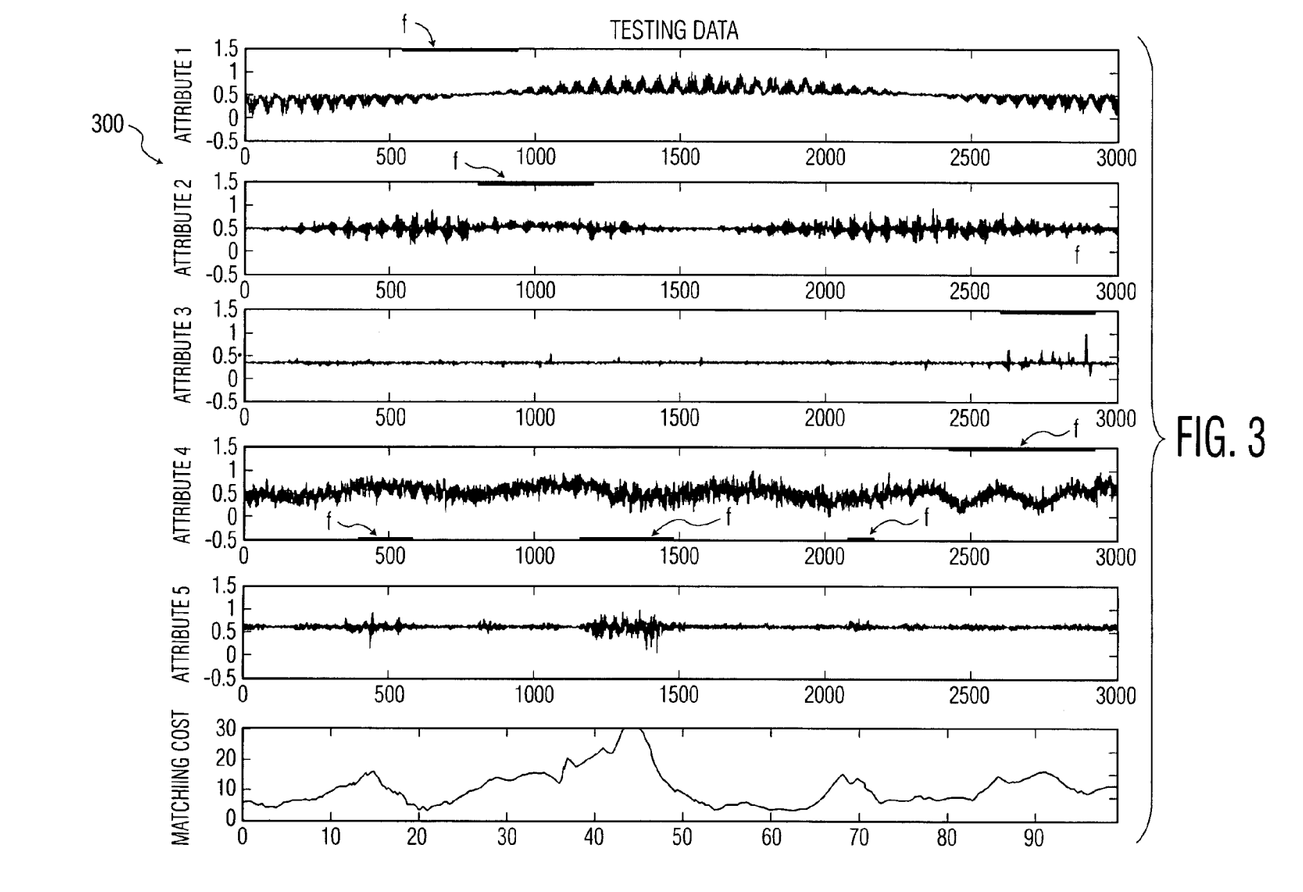
FIG. 3 is a plot showing the synthetic baseline data of FIG. 2 and including faults and costs determined according to a method of the invention.

A matching cost shown at the bottom of the figure is the distance between the moving segment and its closest match in the template set H. It may easily be seen that the cost function goes high when there is some fault among any of the attributes. It is noted that in this experiment all the attributes were independent from each other. That means that the anomalies that occurred were only observable in one attribute at a given instant (with a few exceptions). In practice, however, that is often not the case, as usually the attributes are somehow correlated and so the faults are reflected in more than one attribute. In such a case, the matching cost of such faults could be even higher and hence they would be easily detected by the framework of the present invention.

Figure 4:
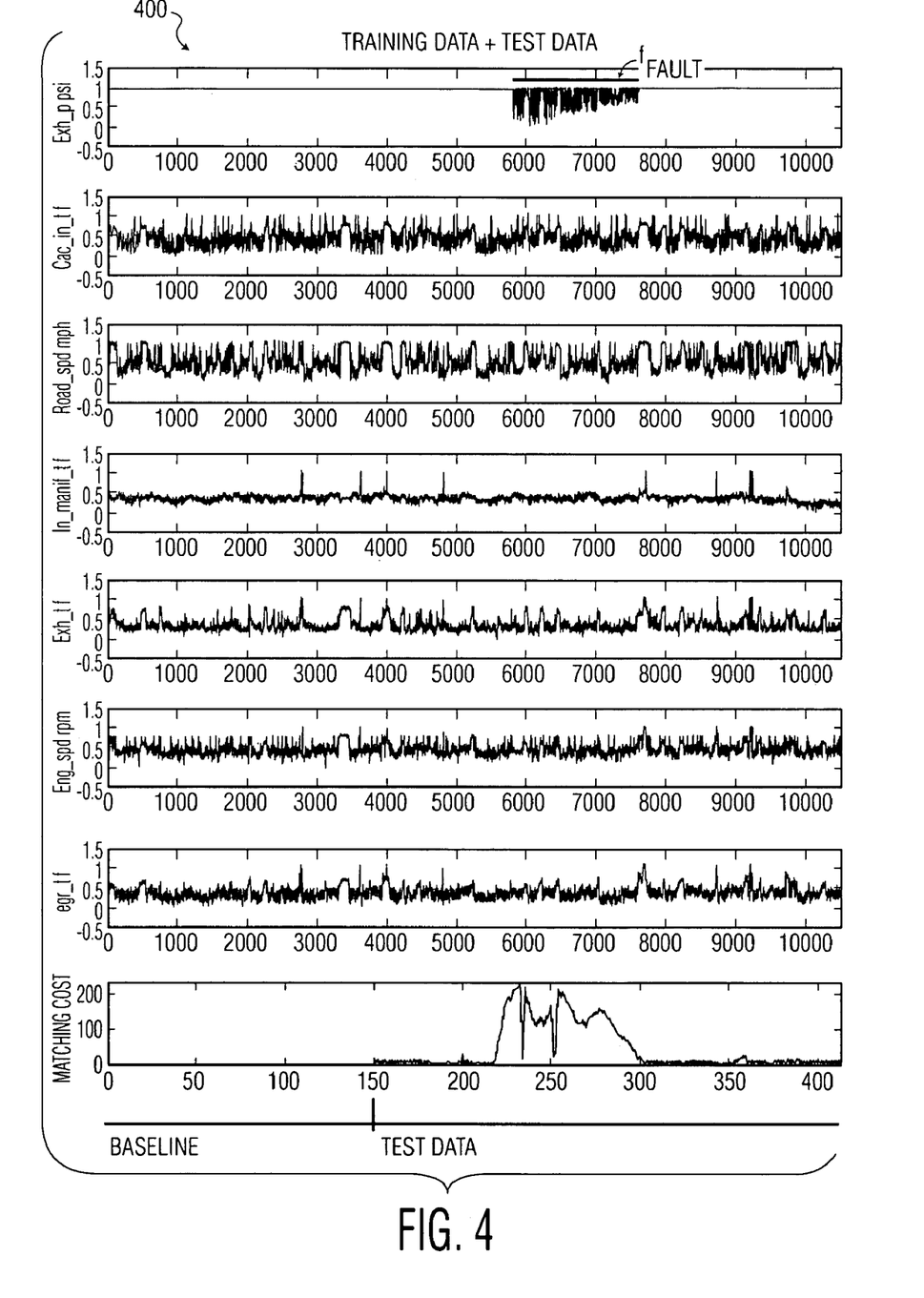
FIG. 4 is a plot showing real world training and test data having six attributes, including faults and costs determined according to a method of the invention.

To test the framework on real world data, the inventors experimented with data streams that were readings from sensors of a truck engine. Different faults that occurred during several test runs were traced, and again those faults were visible either through one and/or more attributes. The plot 400 of FIG. 4 shows real world training and test data containing seven attributes, of which only one attribute contributes to the fault. The fault is traced using the one attribute (the first one). The remaining six attributes show the robustness of the method, as those attributes provided no information about the fault. As with the matching cost shown in FIG. 3, it can again be seen that as the moving segment entered the fault duration, the cost went much higher and so the fault was accurately detected.

Figure 5:
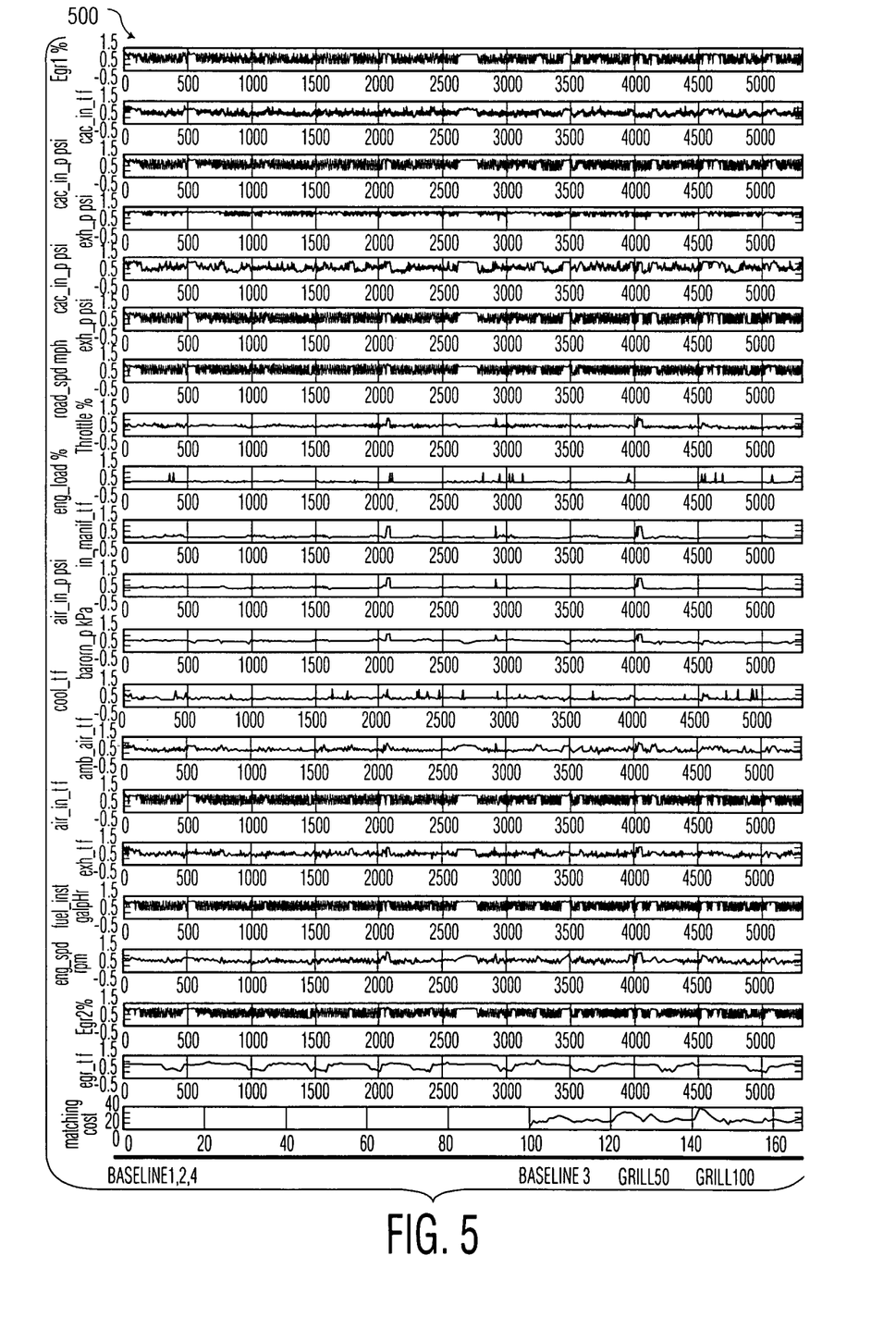
FIG. 5 is a plot showing real world training and test data having twenty attributes, including faults and costs determined according to a method of the invention.

The plot 500 of FIG. 5 shows the results on another fault which is reflected in multiple sensors and was only detectable by a combined analysis of the sensors mainly involved. All the available twenty attributes were tested, while the fault was mainly visible only in two. In the bottom row of FIG. 5, the higher matching cost peaks can be seen in 'Grill50' and 'Grill100', which are the faulty datasets, while in 'Baseline3', the baseline dataset that was left out for validation, the matching cost is relatively low. It was concluded that with persistence handling the whole fault duration can be detected.

Figure 6:
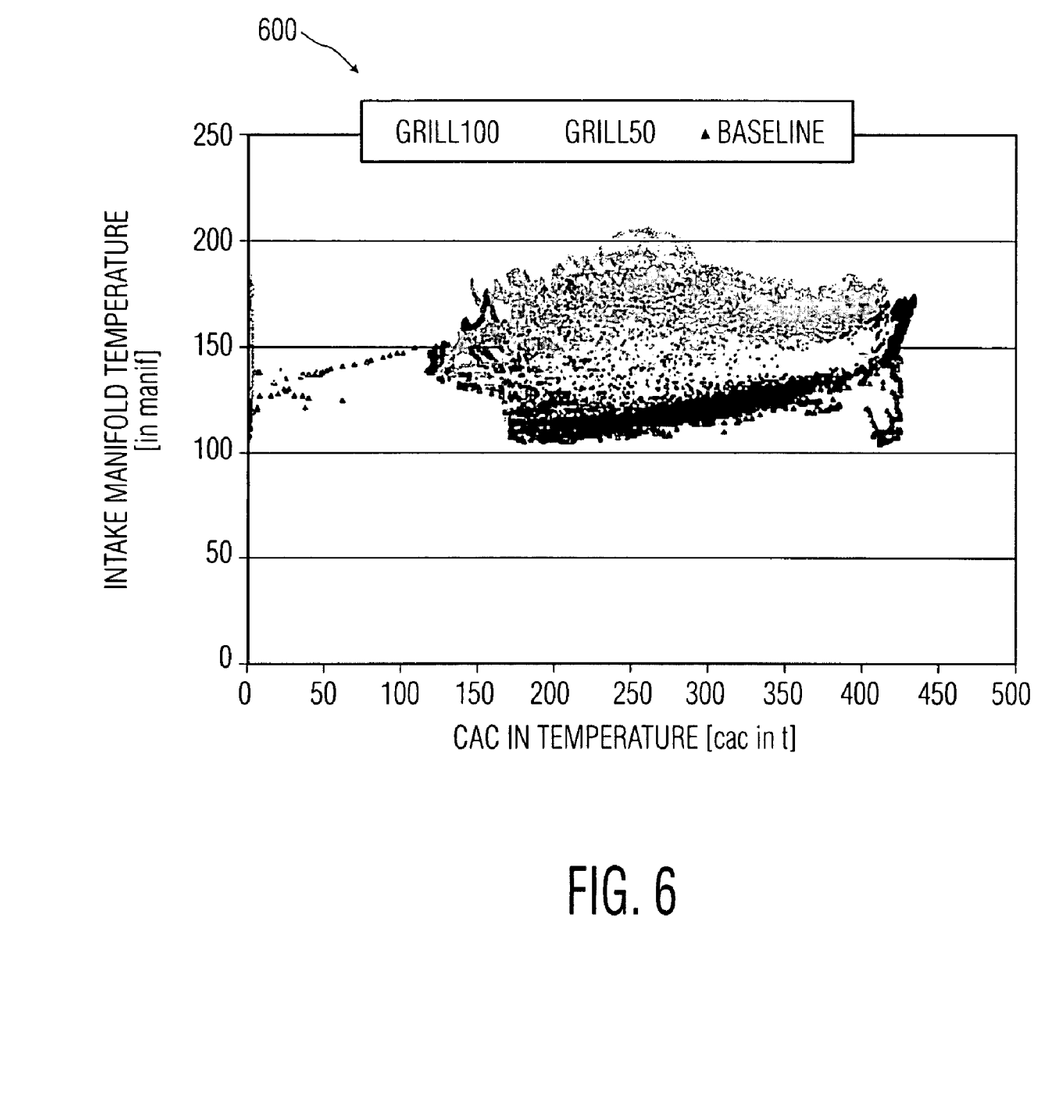
FIG. 6 is another plot showing the real world data of FIG. 5 illustrating faults determined according to a method of the invention.

The plot 600 of FIG. 6 elaborates the illustration of the fault detected in FIG. 5. The plot 600 is a projection of baseline as well as the faulty data in two of those dimensions where the fault clearly shows a distribution change (i.e., a clear drift) in mean and a change in variance in both dimensions. The faulty data set (Grill 50, Grill 100) are clearly visible.

In summary, a novel framework is proposed detecting changes by using the temporal information. The framework can capture faults that are missed by existing methods which do not employ temporal information. The method may, in fact, be used as an auxiliary method to capture faults that are missed by SVM-based algorithms.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the technique is described primarily for use in connection with machine condition monitoring, those skilled in the art will understand that the technique may be used as well in connection with other applications involving multivariate data streams. It is to be understood that the embodiments shown and described herein are-only illustrative of the principles of the present invention and that various modifications may be implemented by those skilled in the art without departing from the scope and spirit of the invention.

What is claimed is:

1. A method for detecting a change from a normal state in a multivariate data stream, the method comprising the steps of:
   (A) receiving a multidimensional training data stream including a plurality of data points representing a normal state;
   (B) sampling a plurality of m segment windows in the training data stream, each segment window representing a predefined time interval in the data stream;
   (C) for each of said plurality of segment windows, summarizing a distribution of data points in the segment window by constructing a training histogram h;
   (D) representing each training histogram $h_i$ by a set of distribution representatives $r_i$ using clustering;
   (E) receiving a test data stream including a plurality of multidimensional data points;
   (F) sampling data points in a plurality of segment windows in the test data stream, each segment window representing a predefined time interval in the data stream;
   (G) for each segment window in the test data, summarizing a distribution of data points in the segment window by constructing a test histogram h';
   (H) representing each test histogram h' by a set of distribution representatives r' using clustering;
   (I) comparing test histograms h' with training histograms $h_i$ using the distribution representatives to find closest matches using a similarity measure S; and
   (J) transmitting an indication that the multivariate data stream contains a change from the normal state for those segments having a similarity measure S indicating a similarity lower than a decision threshold $\sigma$.

2. The method of claim 1, wherein each distribution representative $r_i$ includes:
   a centroid $c_i$ of a cluster;
   a weight $w_i$ representing a number of points in the cluster; and
   a vector $v_i$ representing variation within each feature in the cluster.

3. The method of claim 2, wherein clustering is performed using a DBSCAN spatial clustering algorithm.

4. The method of claim 1, wherein the similarity measure S, for each comparison of a test histogram h' and a training histogram $h_i$ is determined by:

$$S(h',h_i)=\min \text{dist}(h',h_i) \forall h_i.$$

5. The method of claim 4, wherein the similarity $S(h', h_i)$ is calculated by using an earth mover's distance metric between a set of bins A representing h', and a set of bins B representing $h_i$, the distance metric formulated as:

$$EMD(A, B) = \min_{F=\{f_{ij}\}} \frac{\sum_{i=1}^{m} \sum_{j=1}^{n} f_{ij} d_{ij}}{\sum_{i=1}^{m} \sum_{j=1}^{n} f_{ij}},$$

wherein $\sum_{i=1}^{m}\sum_{j=1}^{n}f_{ij}=\min(\sum_{i=1}^{m}a_i, \sum_{j=1}^{n}b_j)$, $\sum_{i=1}^{m}f_{ij} \leq a_i$, and $\sum_{j=1}^{n}f_{ij} \leq b_j$, $a_i$ and $b_j$ are numbers of points in particular bins of A and B respectively, $F=\{f_{ij}\} \in F$, where F is a set of all possible flows between A and B and $f_{ij}$ determines the mass flow from bin i in A to bin j in B, and $d_{ij}$ is the distance or cost of transportation between corresponding bins.

6. The method of claim 4, further comprising the steps of:
   for each test histogram h' wherein S indicates a similarity lower than a decision threshold $\sigma$, computing a global average cost per data point; and
   transmitting an indication that those data points having a cost exceeding the global average cost per data point are anomalies.

7. The method of claim 6, wherein the global average cost per data point is measured taking into account a centroid of the histogram and a span of the histogram.

8. The method of claim 6, wherein the global average cost per data point is measured by calculating a weighted-mean-variance distance.

9. The method of claim 1, further comprising the step of:
   before performing clustering, adding time indices to data points within the segment window.

10. The method of claim 1, wherein the multivariate data stream comprises a data stream from a plurality of sensors monitoring a machine, and the indication that the multivariate data stream contains a change comprises a machine fault alarm.

11. A computer-usable medium having computer readable instructions stored thereon for execution by a processor to perform a method for detecting a change from a normal state in a multivariate data stream, the method comprising the steps of:
   (A) receiving a multidimensional training data stream including a plurality of data points representing a normal state;
   (B) sampling a plurality of m segment windows in the training data stream, each segment window representing a predefined time interval in the data stream;
   (C) for each of said plurality of segment windows, summarizing a distribution of data points in the segment window by constructing a training histogram h;
   (D) representing each training histogram $h_i$ by a set of distribution representatives $r_i$ using clustering;
   (E) receiving a test data stream including a plurality of multidimensional data points;
   (F) sampling data points in a plurality of segment windows in the test data stream, each segment window representing a predefined time interval in the data stream;
   (G) for each segment window in the test data, summarizing a distribution of data points in the segment window by constructing a test histogram h';
   (H) representing each test histogram h' by a set of distribution representatives r' using clustering;
   (I) comparing test histograms h' with training histograms $h_i$ using the distribution representatives to find closest matches using a similarity measure S; and
   (J) transmitting an indication that the multivariate data stream contains a change from the normal state for those segments having a similarity measure S indicating a similarity lower than a decision threshold $\sigma$.

12. The computer useable medium of claim 11, wherein each distribution representative $r_i$ includes:
   a centroid $c_i$ of a cluster;
   a weight $w_i$ representing a number of points in the cluster; and
   a vector $v_i$ representing variation within each feature in the cluster.

13. The computer useable medium of claim 12, wherein clustering is performed using a DBSCAN spatial clustering algorithm.

14. The computer useable medium of claim 11, wherein the similarity measure S, for each comparison of a test histogram h' and a training histogram $h_i$, is determined by:

$$S(h', h_i) = \min \text{dist}(h', h_i) \forall h_i.$$

15. The method of claim 4, wherein the similarity $S(h', h_i)$ is calculated by using an earth mover's distance metric between a set of bins A representing h', and a set of bins B representing $h_i$, the distance metric formulated as:

$$EMD(A, B) = \min_{F=\{f_{ij}\}} \frac{\sum_{i=1}^{m} \sum_{j=1}^{n} f_{ij} d_{ij}}{\sum_{i=1}^{m} \sum_{j=1}^{n} f_{ij}},$$

wherein $\sum_{i=1}^{m}\sum_{j=1}^{n} f_{ij} = \min(\sum_{i=1}^{m} a_i, \sum_{j=1}^{n} b_j)$, $\sum_{i=1}^{m} f_{ij} \leq a_i$, and $\sum_{j=1}^{n} f_{ij} \leq b_j$, $a_i$ and $b_j$ are numbers of points in particular bins of A and B respectively, $F=\{f_{ij}\} \in F$, where F is a set of all possible flows between A and B and $f_{ij}$ determines the mass flow from bin i in A to bin j in B, and $d_{ij}$ is the distance or cost of transportation between corresponding bins.

16. The computer useable medium of claim 14, wherein the method further comprises the steps of:
for each test histogram h' wherein S indicates a similarity lower than a decision threshold σ, computing a global average cost per data point; and
transmitting an indication that those data points having a cost exceeding the global average cost per data point are anomalies.

17. The computer useable medium of claim 16, wherein the global average cost per data point is measured taking into account a centroid of the histogram and a span of the histogram.

18. The computer useable medium of claim 16, wherein the global average cost per data point is measured by calculating a weighted-mean-variance distance.

19. The computer useable medium of claim 11, wherein the method further comprises the step of:
before performing clustering, adding time indices to data points within the segment window.

20. The computer useable medium of claim 11, wherein the multivariate data stream comprises a data stream from a plurality of sensors monitoring a machine, and the indication that the multivariate data stream contains a change comprises a machine fault alarm.

* * * * *